US012596225B2

(12) United States Patent

Beaupré-Laflamme et al.

(10) Patent No.: US 12,596,225 B2

(45) Date of Patent: Apr. 7, 2026

(54) MANAGING ADHESIVE MATERIAL SHAPING USING STRUCTURE ARRAYS

(71) Applicant: Ciena Corporation, Hanover, MD (US)

(72) Inventors: Raphael Beaupré-Laflamme, Quebec (CA); Nicolas Boyer, Magog (CA); François Pelletier, Quebec (CA); Simon Savard, Quebec (CA); Veronique Jomphe Allain, Québec (CA); Luc Bélanger, Quebec (CA)

(73) Assignee: Ciena Corporation, Hanover, MD (US)

( * ) Notice: Subject to any disclaimer, the term of this patent is extended or adjusted under 35 U.S.C. 154(b) by 326 days.

(21) Appl. No.: 18/325,174

(22) Filed: May 30, 2023

(65) Prior Publication Data

US 2024/0345336 A1 Oct. 17, 2024

Related U.S. Application Data

(60) Provisional application No. 63/459,718, filed on Apr. 17, 2023.

(51) Int. Cl.
*G02B 6/12* (2006.01)
*G02B 6/13* (2006.01)
*G02B 6/42* (2006.01)

(52) U.S. Cl.
CPC ................. *G02B 6/12* (2013.01); *G02B 6/13* (2013.01); *G02B 6/4212* (2013.01); *G02B 6/4215* (2013.01); *G02B 6/4279* (2013.01)

(58) Field of Classification Search
CPC .......... G02B 6/12; G02B 6/13; G02B 6/4212; G02B 6/4215; G02B 6/4279
See application file for complete search history.

(56) References Cited

U.S. PATENT DOCUMENTS 6,800,946 B2 * 10/2004 Chason ............... B81C 1/00333
29/841
9,823,419 B1 11/2017 Pelletier et al.
(Continued)

FOREIGN PATENT DOCUMENTS

WO 2022164982 A1 8/2022
WO 2022169763 A1 8/2022

OTHER PUBLICATIONS

Chandra, Dinesh, "Capillary Force in High Aspect-Ratio Micropillar Arrays", Publicly Accessible Penn Dissertations, 430, 2009, https://repository.upenn.edu/edissertations/430.

(Continued)

*Primary Examiner* — Daniel Petkovsek

(74) *Attorney, Agent, or Firm* — Young Basile Hanlon & MacFarlane, P.C.

(57) ABSTRACT

An article of manufacture comprises: at least a portion of a wafer comprising a substrate and one or more layers fabricated on the substrate; one or more integrated photonic structures in the portion of the wafer, where at least a first integrated photonic structure of the one or more integrated photonic structures is associated with an electromagnetic wave propagation region that extends beyond a first surface of a first layer of the one or more layers; an array of liquid guiding structures arranged in a two-dimensional pattern on a portion of the first surface of the first layer; and an adhesive material making contact with the first surface of the first layer and with at least a majority of the liquid guiding structures in the array of liquid guiding structures.

21 Claims, 13 Drawing Sheets

(56)　　　　　　　References Cited

U.S. PATENT DOCUMENTS

| | | | |
|---|---|---|---|
| 10,811,279 B2 * | 10/2020 | Pelletier ................. | H01L 24/17 |
| 11,199,673 B2 * | 12/2021 | Rosenberg ........... | H01L 21/563 |
| 2004/0118599 A1 | 6/2004 | Chason et al. | |
| 2012/0212732 A1 * | 8/2012 | Santori .............. | G01N 21/7703 |
| | | | 977/954 |
| 2021/0033807 A1 | 2/2021 | Rosenberg et al. | |

OTHER PUBLICATIONS

Lambert, Pierre, and Massimo Mastrangeli, "Microscale Surface Tension and its Applications", Micromachines 10, No. 3, 526, Aug. 2019, https://doi.org/10.3390/mi10080526.
Yong Jiale Yang Qing Hou Xun Chen Feng, "Nature-Inspired Superwettability Achieved by Femtosecond Lasers", Ultrafast Sci, vol. 2022, Feb. 7, 2022, DOI: 10.34133/2022/9895418.

* cited by examiner

106

200A

100A

202

MANAGING ADHESIVE MATERIAL SHAPING USING STRUCTURE ARRAYS

CROSS-REFERENCE TO RELATED APPLICATION(S)

This application claims priority to and the benefit of U.S. Provisional Application Ser. No. 63/459,718, entitled "MANAGING ADHESIVE MATERIAL SHAPING USING STRUCTURE ARRAYS," filed Apr. 17, 2023, the entire disclosure of which is hereby incorporated by reference.

TECHNICAL FIELD

This disclosure relates to managing adhesive material shaping using structure arrays.

BACKGROUND

When fabricating devices on photonic integrated circuits (PICs) or other electrical, optical, or electro-optical devices, the addition of layers on a substrate (a panel or wafer, for example) is often done uniformly across the substrate. Organic thin films are generally applied on a substrate using spin coating, which can provide thickness uniformity over a large area. Patterned structures can be created by the combination of a mask (e.g., contact mask or lithographic masks) and a removal process (e.g., plasma etch or wet etch). Adhesive materials can be used in the process of integrated circuit fabrication. For example, some adhesive materials are composed of organic materials that are a viscous liquid in an initial state and can be cured to transform into a relatively hard and/or solid state. For some uses, the adhesive materials are optical adhesives that have a relatively high transmittance (e.g., at least 80%).

SUMMARY

In one aspect, in general, an article of manufacture comprises: at least a portion of a wafer comprising a substate and one or more layers fabricated on the substrate; one or more integrated photonic structures in the portion of the wafer, where at least a first integrated photonic structure of the one or more integrated photonic structures is associated with an electromagnetic wave propagation region that extends beyond a first surface of a first layer of the one or more layers; an array of structures arranged in a two-dimensional pattern on a portion of the first surface; and an adhesive material making contact with the first surface and with at least a majority of the structures in the array of structures.

Aspects can include one or more of the following features.

The two-dimensional pattern has a lower density over a first portion of the first surface in proximity to the electromagnetic wave propagation region than a second portion of the first surface that is further from the electromagnetic wave propagation region than the first portion of the first surface.

The two-dimensional pattern has rectangular shape and has a higher density in proximity to each of the corners of the rectangular shape than at least some other portions of the rectangular shape.

The two-dimensional pattern includes at least one exclusion zone in which no structures in the array of structures are located.

The electromagnetic wave propagation region only extends beyond the first surface within the exclusion zone.

No portion of the electromagnetic wave propagation region that extends beyond the first surface is within 5 microns of a border of the exclusion zone.

The two-dimensional pattern includes a first portion over a first portion of the first surface in proximity to the electromagnetic wave propagation region and having a first size (e.g., area over the first surface), a second portion over a second portion of the first surface having a second size (e.g., area over the first surface), and a third portion over a third portion of the first surface between the first portion of the first surface and the second portion of the first surface and having a third size (e.g., area over the first surface) that is less than the first size and less than the second size.

The electromagnetic wave propagation region comprises an evanescent field region of an optical mode defined by the first integrated photonic structure.

The electromagnetic wave propagation region comprises a stray light region associated with a portion of the first integrated photonic structure configured to scatter stray light.

The electromagnetic wave propagation region comprises a radio frequency (RF) propagation region configured to absorb a portion of an RF electromagnetic wave associated with an electrical signal in proximity to the first integrated photonic structure.

The adhesive material has an index of refraction that is lower than or substantially equal to an index of refraction of a material of which the first layer is composed, and the adhesive material has an optical transmittance of at least 80% when cured over at least some spectrum of optical wavelengths.

The index of refraction of the adhesive material is between 1.4 and 1.5.

The adhesive material has been cured by ultraviolet light.

The structures in the array of structures consist essentially of a polymer material.

The polymer material comprises at least one of: polyimide, benzocyclobutene (BCB), or polybenzoxazoles (PBO).

The structures in the array of structures have heights relative to the first surface of less than 20 microns.

At least some of the structure in the array of structures have different heights relative to the first surface.

The substrate comprises a semiconductor substrate.

In another aspect, in general, a method comprises: forming one or more integrated photonic structures in at least a portion of a wafer comprising a substrate and one or more layers fabricated on the substrate, where at least a first integrated photonic structure of the one or more integrated photonic structures is associated with an electromagnetic wave propagation region that extends beyond a first surface of a first layer of the one or more layers; forming an array of structures arranged in a two-dimensional pattern on a portion of the first surface; dispensing an adhesive material onto a portion of the array of structures; and curing the adhesive material after the adhesive material spreads, at least in part by capillary flow, to make contact with the first surface and with at least a majority of the structures in the array of structures.

Curing the adhesive material can comprise exposing the adhesive material to ultraviolet light.

At least one of a direction or a thickness of spread of the adhesive material is based at least in part on at least one of a distance from one or more structures of the array of structures to an edge of the portion of the wafer, a spacing between at least two structures of the array of structures, a diameter of at least one structure of the array of structures, or a height of at least one structure of the array of structures.

Aspects can have one or more of the following advantages.

When applying liquids (e.g., adhesive materials) to a substrate, drops can be dispensed and cured on a flat surface of the substrate, or on another layer of the substrate with a control volume to limit the spread of the liquid. This results in the liquid having a more or less dome-like shape with a thickness driven by the viscosity and surface tension of the liquid, as well as the surface energy of the substrate. The drop spread and thickness can be controlled by adding a microscopic object (e.g., a glass block) on top of it. This object around which an adhesive fillet can be created allows for the 3D confinement of the adhesive. Inversely, it is possible to install the object before the application of the adhesive. The application of the adhesive at the junction of the substrate and of the object allows for a controlled spread of the adhesive, where the gap between the object and the substrate controls the adhesive height. However, precise handling and positioning of objects of this size can be complex. Controlling the height of an object above the substrate to control the adhesive thickness can be complex and, in this example, may cause assembly and performance issues, as a cavity or through hole may be needed to install such a structure. Furthermore, unless the object is secured, it may move or be transported by the applied liquid. Securing the object in place may be possible, but can be complex when creating multiple adhesive areas over an entire wafer, for example. The retaining mechanism itself may interfere with other elements of the system.

Other approaches may incorporate dam structures, which can be created by adding lines of material in order to constrain the spread of a liquid material, such as an adhesive. Under specific conditions, dams can stop the flow of an added liquid, but may have limited efficacy in controlling the thickness of the liquid as they do not counteract the liquid surface energy.

In contrast, the liquid guiding (LG) structures described herein may be arranged in a two-dimensional pattern on a surface to control the 3D distribution (e.g., spread, thickness and overall shape), at a micrometric level, of an applied liquid, such as an adhesive material before curing. The LG structures act as "capillaries" to force the spread in a desired direction and/or as a stopper using the wicking action to prevent the adhesive from spreading out further. The LG structures allow for precise height control and can allow for flatter, non-dome-like shapes of the liquid material. Furthermore, the LG structures can have higher positional accuracy due to being fabricated on the substrate and not relying on external positioning or objects.

As an additional benefit, the individual shapes of the LG structures or the pattern of LG structures on a substrate can have numerous designs to direct or prevent the adhesive flow in directions of interest (e.g., prevent the flow onto an optical facet or over copper pillar bumps). For example, the density of LG structures over the substrate can be constant or it can vary to locally adjust the capillary flow and the adhesive thickness. Additionally, the shape of the individual relief features can be designed to either favor or deter the capillary flow, depending on the location and requirements.

In some implementations, the LG structures enable application of a low viscosity adhesive (e.g., less than about 100 cP) with highly specific mechanical properties (e.g., good adhesion to the surface when cured, and/or good flow characteristics when uncured) and optical properties (e.g., refractive index, transparency in IR, and/or ultraviolet (UV))

curable characteristics) exactly on top of a spot size converter (SSC) without spreading into in a zone where an interconnect and an underfill can be utilized. Also, the described techniques enable the fabrication procedure to apply and cure the adhesive at the wafer-level.

Such adhesive layers can be used in a silicon photonics chip, for example, to ensure an SSC is able to perform appropriately. In some cases, the optical surface of the silicon photonics chip may not be inspected as it will be in very close proximity (e.g., less than about 50 μm) from the surface of a platform on which the chip is being assembled (e.g., a high-density build-up (HDBU), a substrate-like printed circuit board (SLP), or a printed circuit board (PCB)). Therefore, there may be a need to deposit the adhesive prior to assembly, in some cases, at the wafer level. Since the wafers may have deep trench etched cavities on the surface (e.g., formed by deep reactive-ion etching (DRIE)), the techniques described herein enable deposition of an adhesive material having particular refractive index to properly shape and confine an optical mode with an evanescent field region that extends into the adhesive material region. Without the techniques described herein, the refractive index that would be compatible with an SSC or other integrated photonic structure (e.g., a refractive index of around 1.44) may not be able to be easily deposited by means of an oxide (e.g., tetraethoxysilane (TEOS)), or may not be able to be easily deposited at a particular stage of fabrication (e.g., back-end-of-line).

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figures 1A, 1B:
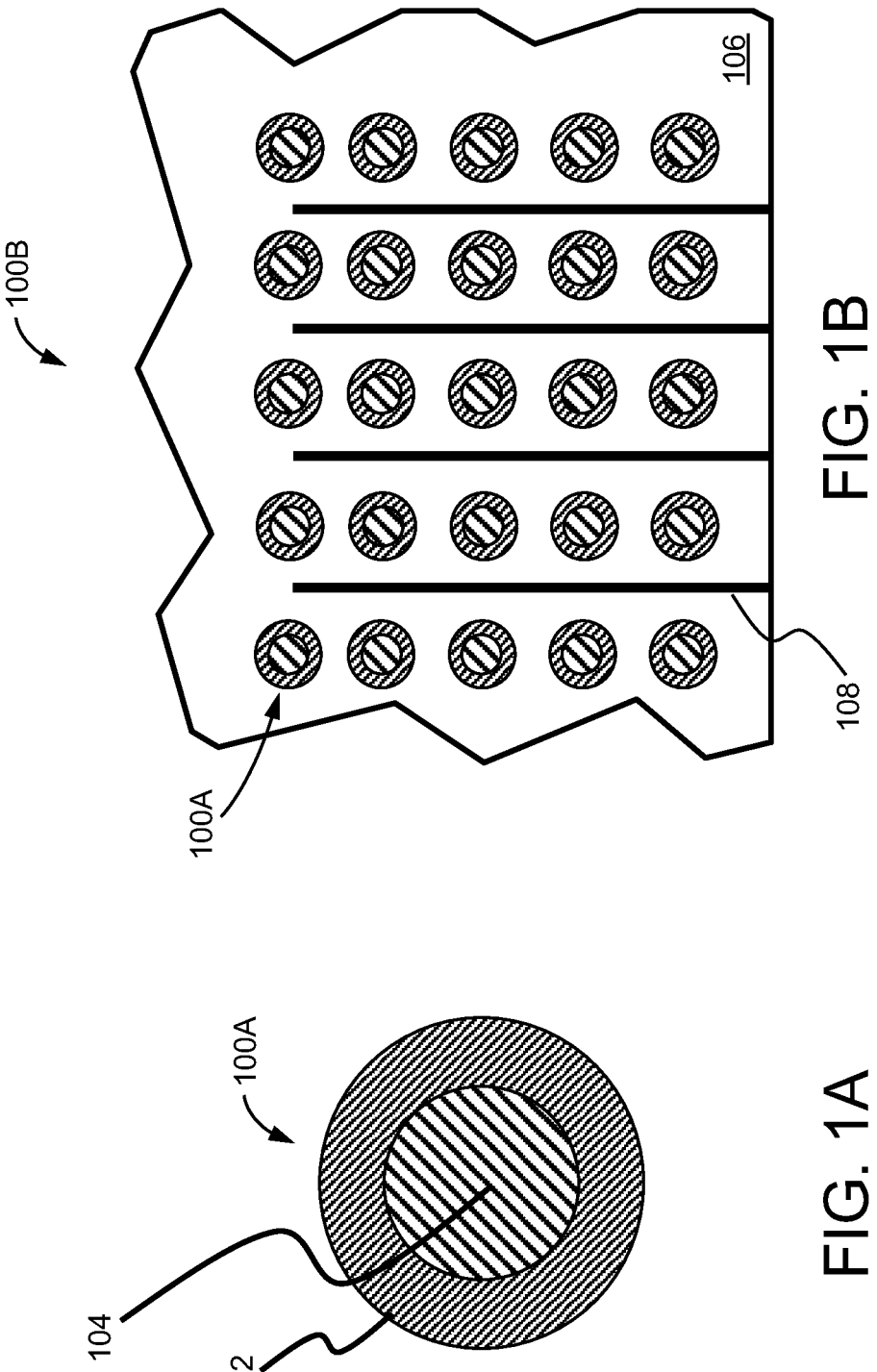
FIG. 1A is a schematic diagram of an example liquid guiding (LG) structure.
FIGS. 1B and 1C are schematic diagrams from a top and a side cross-sectional view, respectively, of an example photonic integrated circuit with a liquid guiding structure array (PIC-LGSA).

Thin film deposition by spin coating may be very sensitive to any surface topography created by the summation of patterns on the underlying layers, surface structures, cavities, trenches, or even particulate contamination. Some implementations of the approaches described herein provide a way to directly apply a controlled patch of liquid material (e.g., a material providing adequate viscosity, wettability and chemical compatibility with patterned structures) with a controlled thickness to a substrate surface or other reference plane, such as a surface of a deposited layer. As used herein, a "liquid material" refers to any material in a liquid or semi-liquid state with a viscosity low enough so that it has the ability to flow. In some implementations, the liquid material is an adhesive material before being cured (e.g., curing by exposure to UV light). As used herein, the term "adhesive material" refers to the adhesive material in any state, including a state before, during, or after curing. Before and during dispensing of the adhesive material, the adhesive material can be in a liquid or semi-liquid state with a relatively low viscosity. During and after curing of the adhesive material, the adhesive material can be in a semi-cured or cured state that has a relatively higher viscosity, or is no longer flowing and/or has an increased hardness.

In some implementations, the liquid material may need to be controlled within areas as small as 1 mm×0.3 mm, with a maximum adhesive thickness of 0.03 mm, for example. Precise handling and positioning of retaining objects of this size can be complex. Controlling the height of an object (e.g., a glass block) above the substrate to control the adhesive thickness is also complex and, in this example, may cause assembly and performance issues, as a cavity or through hole may be needed to install such a structure. Furthermore, unless the object is secured, it may move or be transported by the applied liquid. Securing the object in place may be possible, but can be complex when creating multiple adhesive areas over an entire wafer, for example. The retaining mechanism itself may interfere with other elements of the system.

Dam structures, under specific conditions, can stop the flow of an added liquid. They may have a limited efficacy in controlling the thickness of the liquid as they do not counteract the liquid surface energy.

Some examples of the techniques described herein pertain to the addition of an array of liquid guiding (LG) structures arranged in a two-dimensional pattern on a surface to control the 3D distribution (spread, thickness and overall shape), at a micrometric level, of an applied liquid, such as an adhesive material before curing. The LG structures can act as "capillaries" to force the spread in a desired direction and/or as a stopper using the wicking action to prevent the adhesive from spreading out further. Methods for creating the LG structures include but are not limited to ink jetting, stamping, chemical vapor deposition, evaporation (e.g., with masks), or lithography. The materials used can include metal or organic material structures. The structures can be created in a single layer or by stacking several layers.

The shapes of the resulting cured adhesive material tailored by the array of LG structures can serve many purposes including but not limited to: forming one or more local protective layers, bumpers, and/or stoppers, and/or providing gap limiting action for chip on wafer (CoW) or chip on chip (CoC) packaging, or other gap or spacer features for controlling spacing; assisting with optical propagation and acting as confinement structures, optical elements (e.g., lenses), stray light absorbers, and/or comprising a radio frequency dielectric function used as an RF absorber or for formation of a controlled RF environment (e.g., by providing a permittivity (Dk) and loss tangent (Df) in proximity to RF electromagnetic waves).

FIG. 1A shows an example LG structure 100A (e.g., a polyimide (PI), benzocyclobutene (BCB), or polybenzoxazoles (PBO) structure). In this example, the LG structure 100A includes two different cylindrical shaped portions, with a first larger radius portion 102 underneath and a second smaller radius portion 104 stacked on top. In other examples, the LG structure could consist of a single cylindrical shaped portion, or could comprise a larger number of stacked portions, or portions having other shapes. An array of LG structures can be created at wafer-level through the superposition of a first LG mask for patterning the portion 102 and a second LG mask for patterning the portion 104, for example. In some examples, the LG structure 100A may have a height of approximately 10 μm (e.g., the first and second portions each having a height of approximately 5 μm).

Figure 1C:
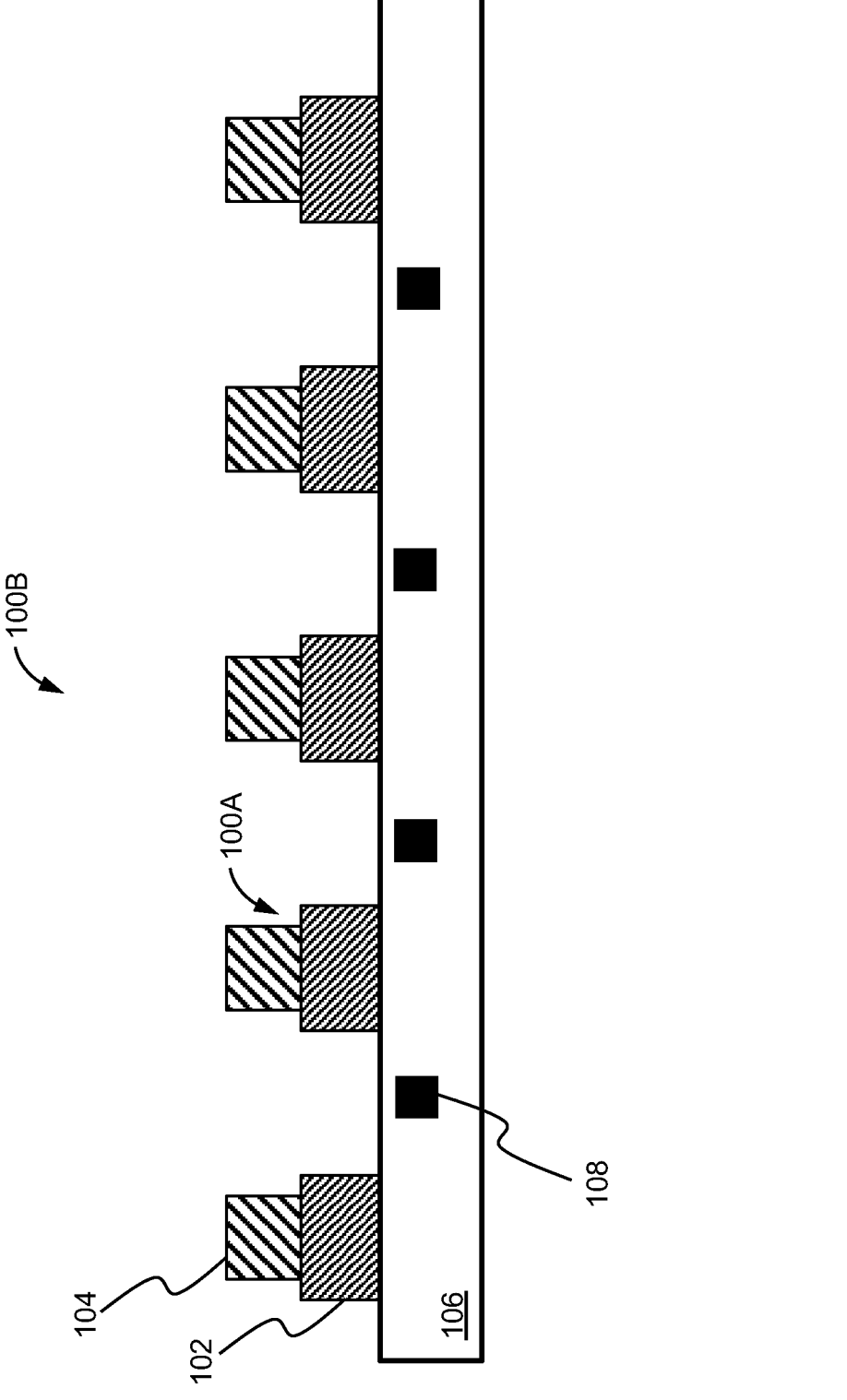

FIGS. 1B and 1C show a top and a side cross-sectional view, respectively, of an example PIC-LGSA 100B (photonic integrated circuit with a liquid guiding structure array) comprising LG structures 100A formed on top of a photonic wafer 106 (e.g., a silicon, or silicon-on-insulator wafer). The photonic wafer 106 comprises waveguides 108 (under the surface in FIG. 1B) that may be arranged to have some separation from the LG structures 100A, since the LG structures 100A may have a large refractive index that may disrupt an optical mode guided by the waveguides 108 (e.g., an evanescent field of the guided optical mode). The waveguides 108 may be formed from a medium (e.g., silicon) that is embedded within a lower index medium (e.g., silicon dioxide) of the photonic wafer 106 serving as a cladding, and the waveguides 108 may be connected to spot size converters (not shown) used for coupling at the edge of a chip, for example. In some implementations, the PIC-LGSA 100B can use the LG structures 100A to precisely control (e.g., in 3D) the distribution of an adhesive having specific optical properties in proximity to the optical structures (e.g., waveguides 108). The adhesive can be cured by UV illumination or thermally as it reaches its equilibrium state governed by the surface tension of the substrate and of the designed LG structures 100A. The adhesive can be applied and cured on individual PICs or at wafer-level (i.e., before singulation of the PIC). For example, curing can start after a predetermined time after dispensing has started or has finished; or spreading of the adhesive on one or more arrays on a wafer can be monitored, and curing can start when a predetermined amount of spreading has occurred.

In some implementations, the LG structures in an array can be kept away from a portion of an optical mode that will extend into the adhesive material by forming one or more exclusion zones. Thus, the differing index of refraction of the structures (e.g., 1.6) will not interfere with the optical mode. There may also be a large variation in temperature (e.g., 15-400° C.), which could cause stress around the structures and change properties of the waveguide medium and/or of the adhesive material (e.g., a change refractive index, and/or a birefringence). In the example of FIGS. 1B and 1C, there is an exclusion zone around the waveguides (e.g., 5-20 μm on either side).

In some implementations, the low refractive index $SiO_2$ layer on top of a spot-size conversion (SSC) structure on a PIC is not thick enough to provide an optimized mode conversion from an optical fiber (e.g., with a mode field of approximately 9 μm) to a silicon waveguide that guides an optical mode that may be larger than the waveguide structure itself (e.g., comprising an evanescent field extending past the top surface of the substrate). This lack of confinement can lead to increased optical losses and disruption of the optical beam if a higher refractive index contaminant or adhesive (e.g., underfill) is to come in contact with the surface.

Figure 2A:
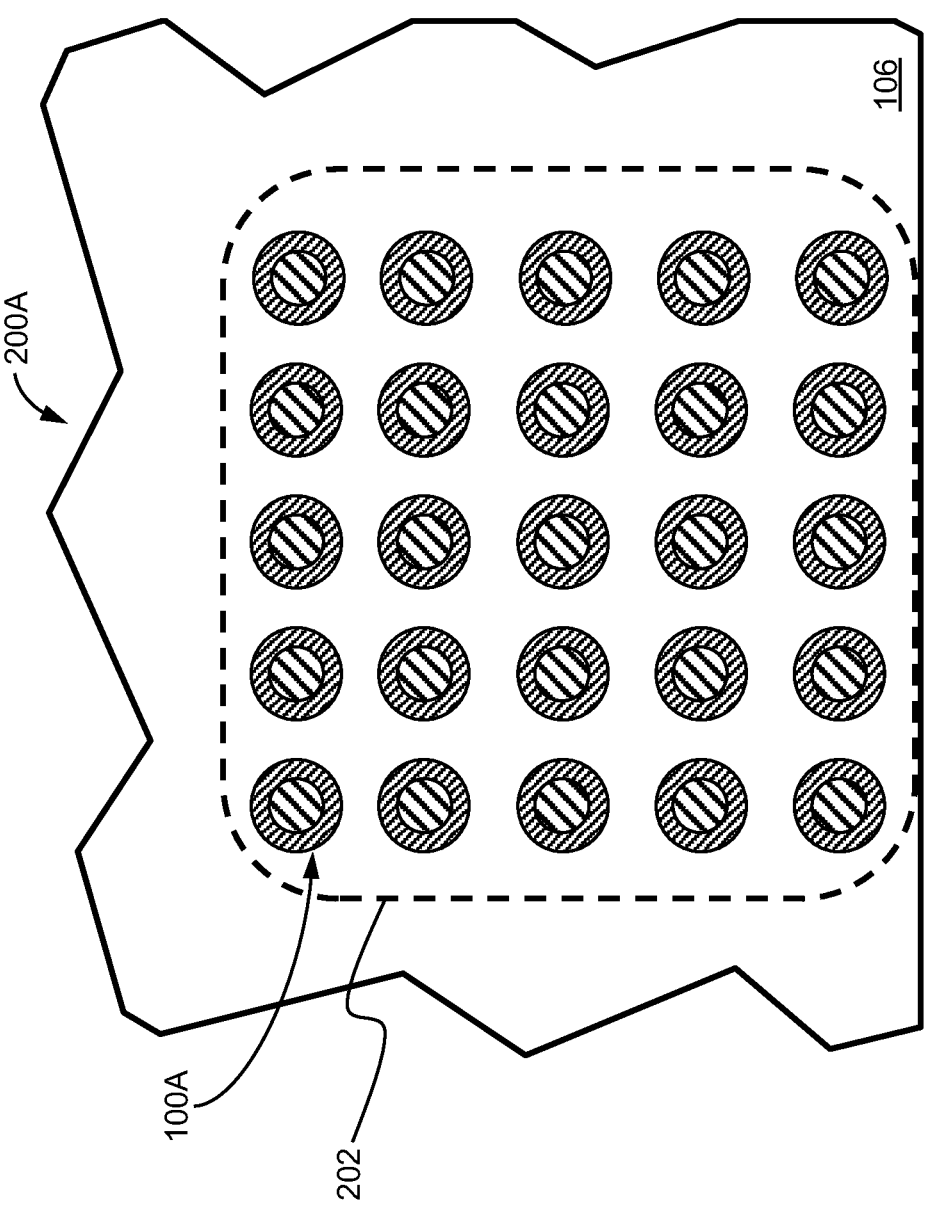
FIGS. 2A and 2B are schematic diagrams from a top and a side cross-sectional view, respectively, of an example PIC-LGSA with adhesive material.
Figure 2B:
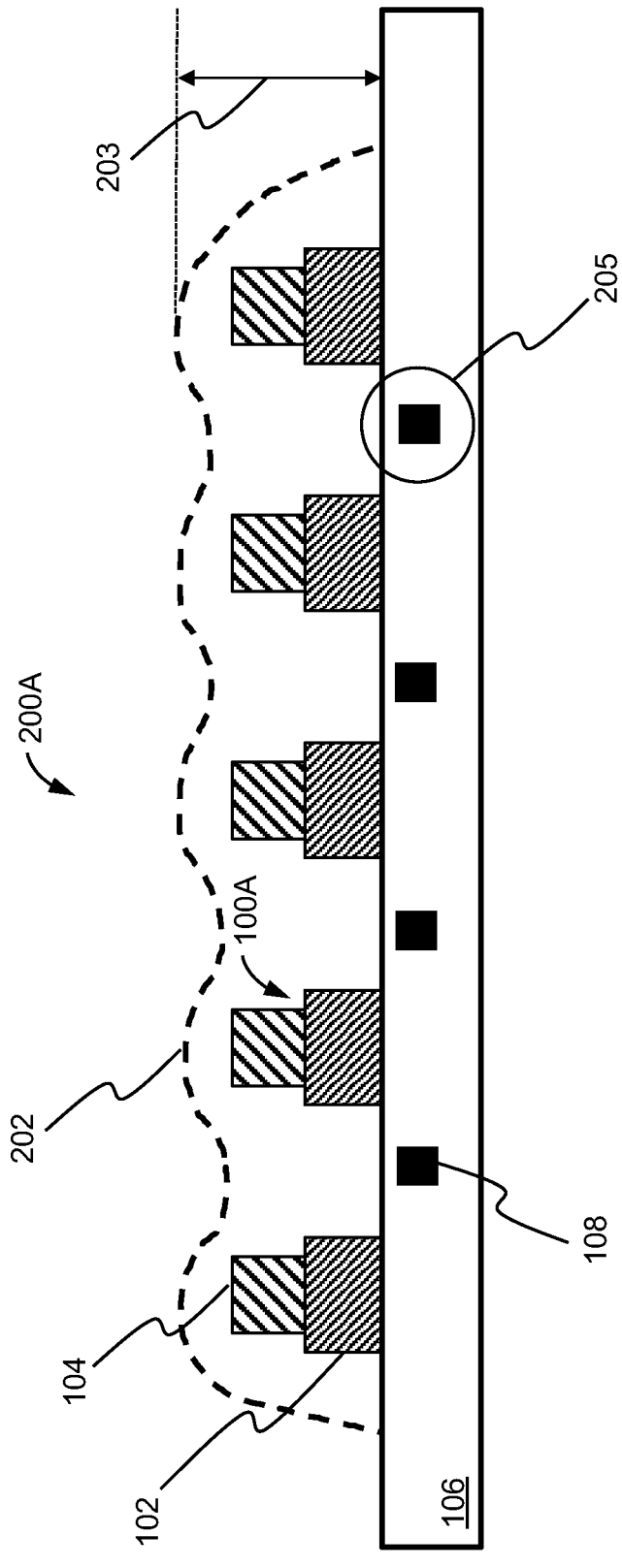

FIGS. 2A and 2B show a top and a side cross-sectional view, respectively, of an example PIC-LGSA 200A with applied adhesive material 202. In some examples, the addition of the adhesive material 202 with a specific refractive index completes the cladding of a waveguide 108 or SSC (not shown in FIG. 2A, but present under the surface) by providing additional confinement for one or more optical modes. By acting as capillaries, the LG structures can enable control over a height 203 of the adhesive material 202. For example, the height 203 can be less than 20 μm. In some cases, the adhesive material 202 cannot be applied over the entire surface of the PIC-LGSA 200A as it would interfere with interconnects, underfill, and/or other chip on chip assembly in the downstream process. Also, if the adhesive layer is too thick, it can interfere with a substrate on which the PIC will be assembled to in a flip chip configuration. As an example of the confinement properties of the adhesive material 202 after it has been cured, FIG. 2B also shows an associated electromagnetic wave propagation region 205 that extends beyond a surface of a top layer of the photonic wafer 106 in which the waveguides 108 are formed. In this example, the electromagnetic wave propagation region 205 corresponds to an evanescent field region of an optical mode defined by one of the waveguides 108. In other examples, an electromagnetic wave propagation region may correspond to a stray light region associated with a portion of an integrated photonic structure configured to scatter stray light, or a radio frequency (RF) propagation region configured to absorb a portion of an RF electromagnetic wave associated with an electrical signal in proximity to an integrated photonic structure.

Figure 2C:
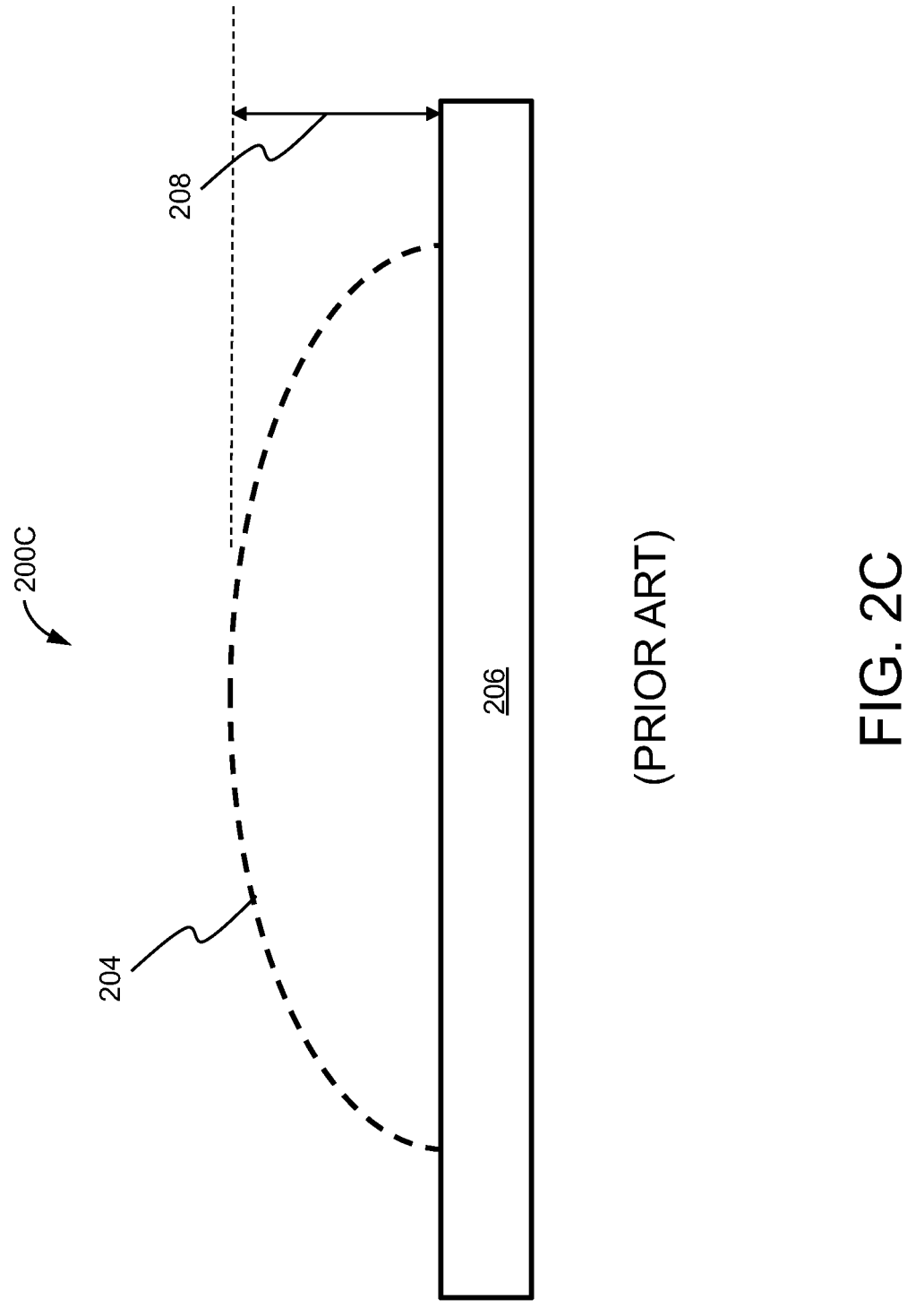
FIG. 2C is a schematic diagram from a side cross-sectional view of an example applied adhesive material without a LG structure array.

FIG. 2C shows a schematic diagram from a side cross-sectional view of an example PIC 200C without an array of LG structures. An adhesive material 204 has been applied on top of a photonic wafer 206 and has a dome-like shape with a thickness driven by the viscosity and surface tension of the adhesive material 204, as well as the surface energy of the top surface of the photonic wafer 206. The height of the adhesive material 204 may be larger than 200 μm, and can possibly interfere with the substrate on which the PIC 200C will be assembled in a flip chip configuration.

When LG structures are used, they can be arranged to disrupt the surface tension and energy in order to spread the liquid of an uncured adhesive material in a controlled fashion. LG structures can be placed close enough to each other to allow a capillary flow of the liquid between them. The wicking of the liquid around the LG structures can spread the liquid in the substrate plane and counteract its surface tension (i.e., its propensity to form a rounded drop) in order to control the liquid height. For example, 10 μm high LG structures of diameter between 33 μm and 50 μm and with an array pitch between 58 μm and 100 μm can be used in some implementations. A regular grid of LG structures can be used, or the grid may be arranged in an irregular (e.g., chirped) manner to further influence the total height of the liquid.

Figures 3, 4:
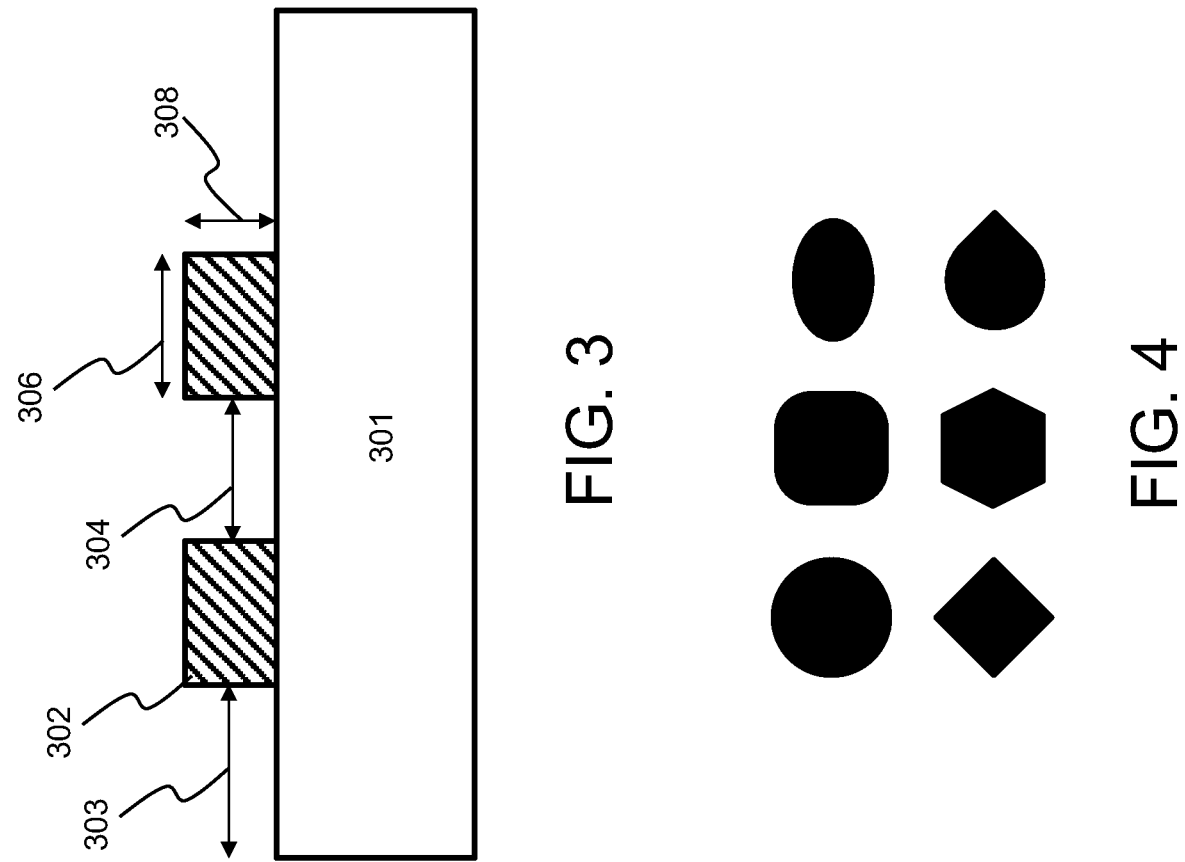
FIG. 3 is a schematic diagram from a side cross-sectional view of an example PIC-LGSA.
FIG. 4 is a schematic diagram of example shapes of LG structures.

FIG. 3 shows a side cross-sectional view of an example PIC-LGSA comprising a photonic wafer 301 and two example single-layer LG structures 302. A distance to die edge 303, a spacing 304, a diameter 306, and a height 308 are all design parameters that may be adjusted depending on the desired application, as described previously.

FIG. 4 shows example shapes of the resulting array of LG structures, the shapes comprising a circle, a rounded square, an oval, a square, a hexagon, and a tear-drop. In some implementations, there may be a relatively large number of LG structures making up the array (e.g., tens or hundreds). In these examples, the individual LG structures are not resolved within the shape of example arrays.

Figure 5C:
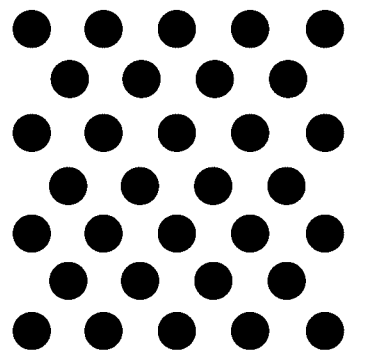
FIGS. 5A, 5B, 5C, and 5D are schematic diagrams of example LG structure arrays.
Figure 5B:
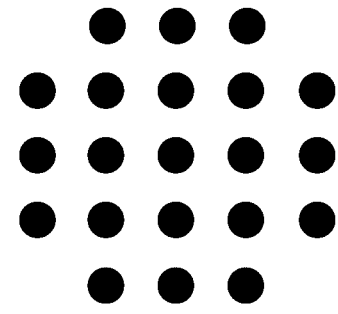
Figure 5D:
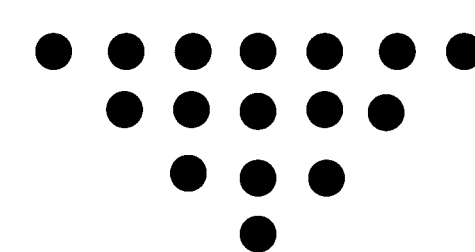
Figure 5A:
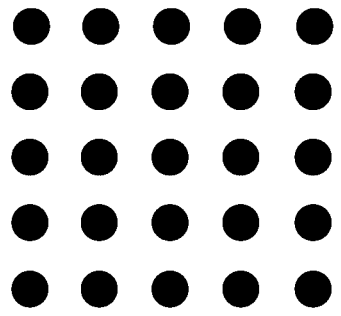

FIGS. 5A, 5B, 5C, and 5D show example LG structure arrays. In these examples, each array has a relatively small number of LG structures for illustration purposes. FIG. 5A shows a square matrix, FIG. 5B shows a square matrix without corners, FIG. 5C shows a staggered array, and FIG. 5D shows a triangular array.

FIGS. 6A, 6B, 6C, and FIG. 7 show examples of different kinds of chirped arrangements in which the density of the two-dimensional pattern in which the LG structures are arranged is higher or lower in different regions. This can help control where the adhesive material slows or stops flowing.

Figure 6B:
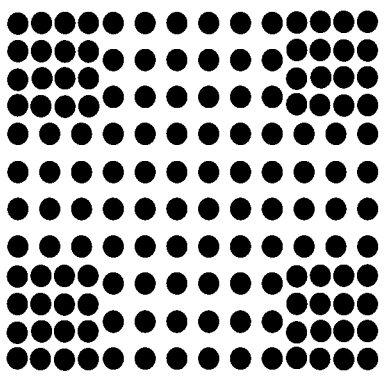
FIGS. 6A and 6B are schematic diagrams of example LG structure arrays.
Figure 6A:
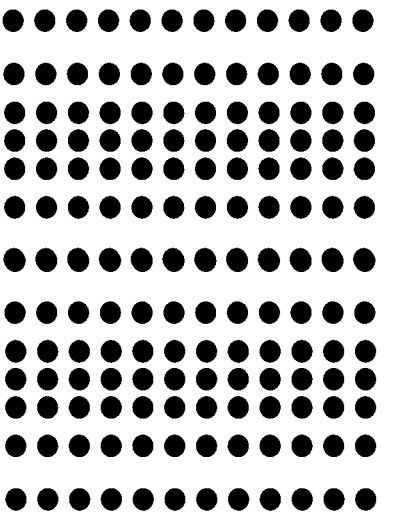

FIG. 6A has a density of LG structures that is chirped along the horizontal axis.

FIG. 6B has a higher density of LG structures at the corners to improve the flow of liquid and to properly fill the corners.

Figure 6C:
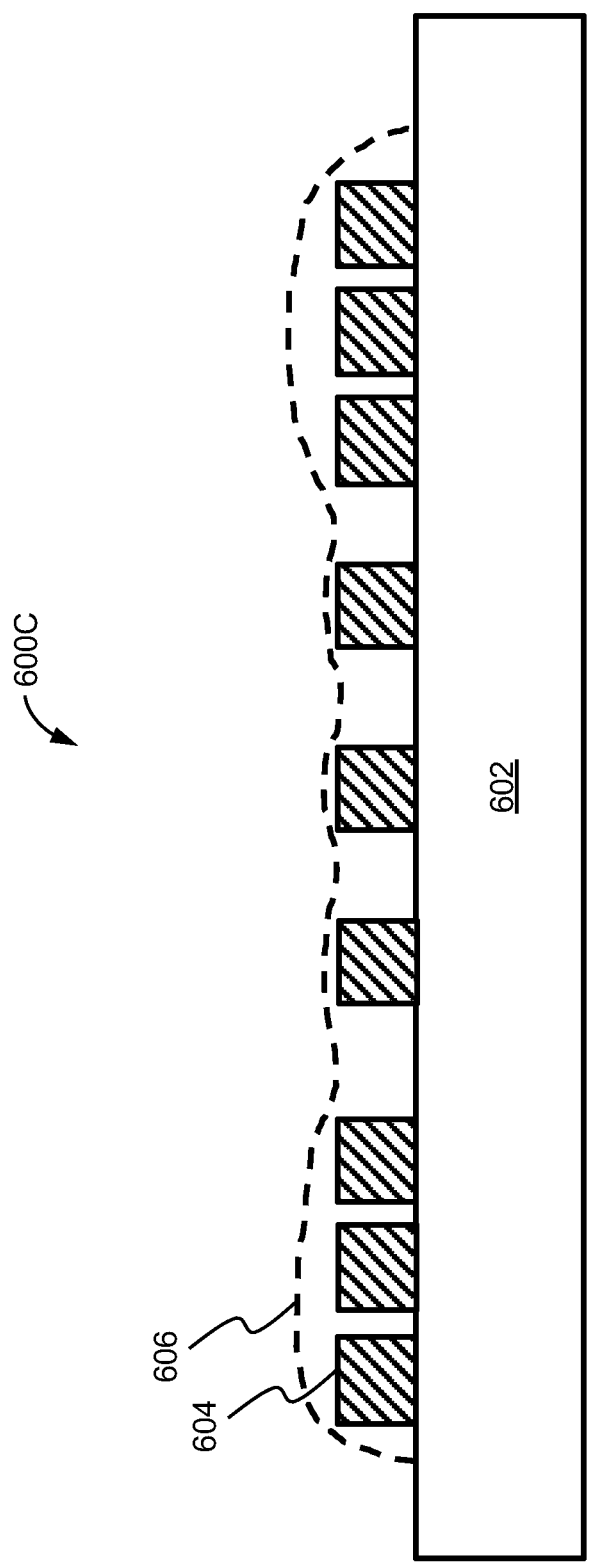
FIG. 6C is a schematic diagram from a side cross-sectional view of an example integrated circuit with a liquid guiding structure array (IC-LGSA).

FIG. 6C shows a side cross-sectional view of an example IC-LGSA 600C (integrated circuit with a liquid guiding structure array) comprising a wafer 602, LG structures 604, and adhesive material 606. The height of the adhesive material 606 is thicker in proximity to regions in which the pattern is denser, and/or thinner in regions in which the pattern is less dense.

Figure 7:
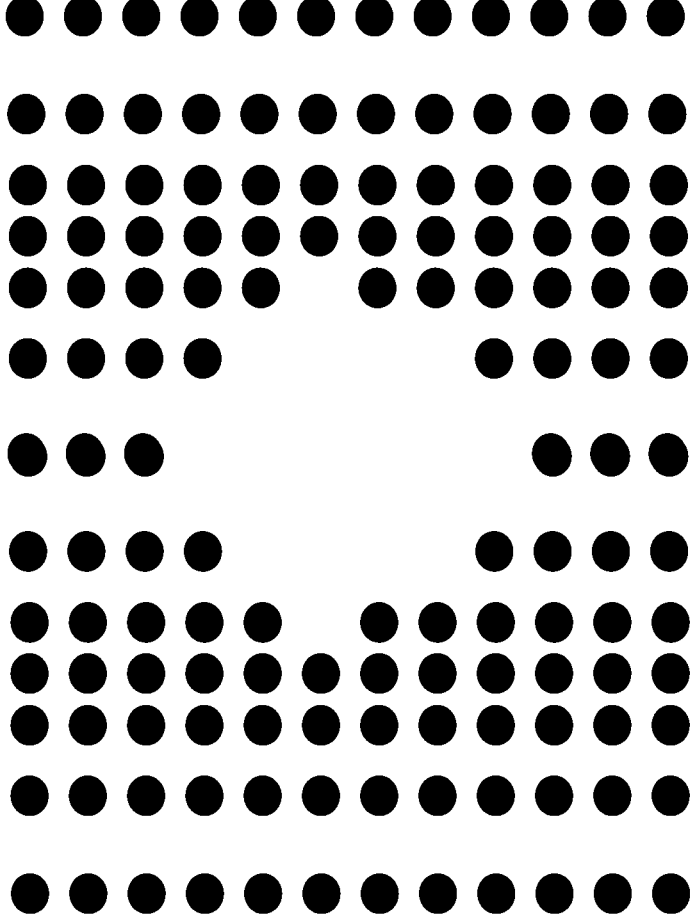
FIG. 7 is a schematic diagram of an example LG structure array.

FIG. 7 shows a schematic diagram of an example LG structure array with no LG structures at its center. Such a 2D pattern can be combined with control of the heights of the LG structures along the third dimension (out of page) to provide better 3D control.

Figure 8:
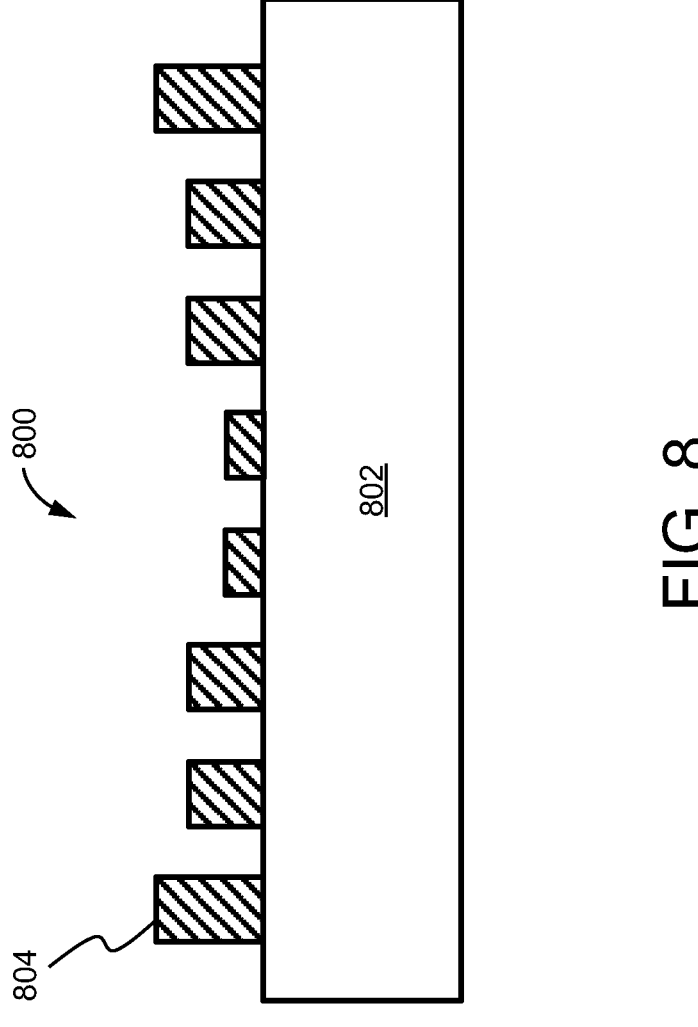
FIG. 8 is a schematic diagram from a side cross-sectional view of an example IC-LGSA.

FIG. 8 shows a schematic diagram from a side cross-sectional view of an example IC-LGSA 800 comprising a wafer 802 and LG structures 804 of varying heights.

Figure 9A:
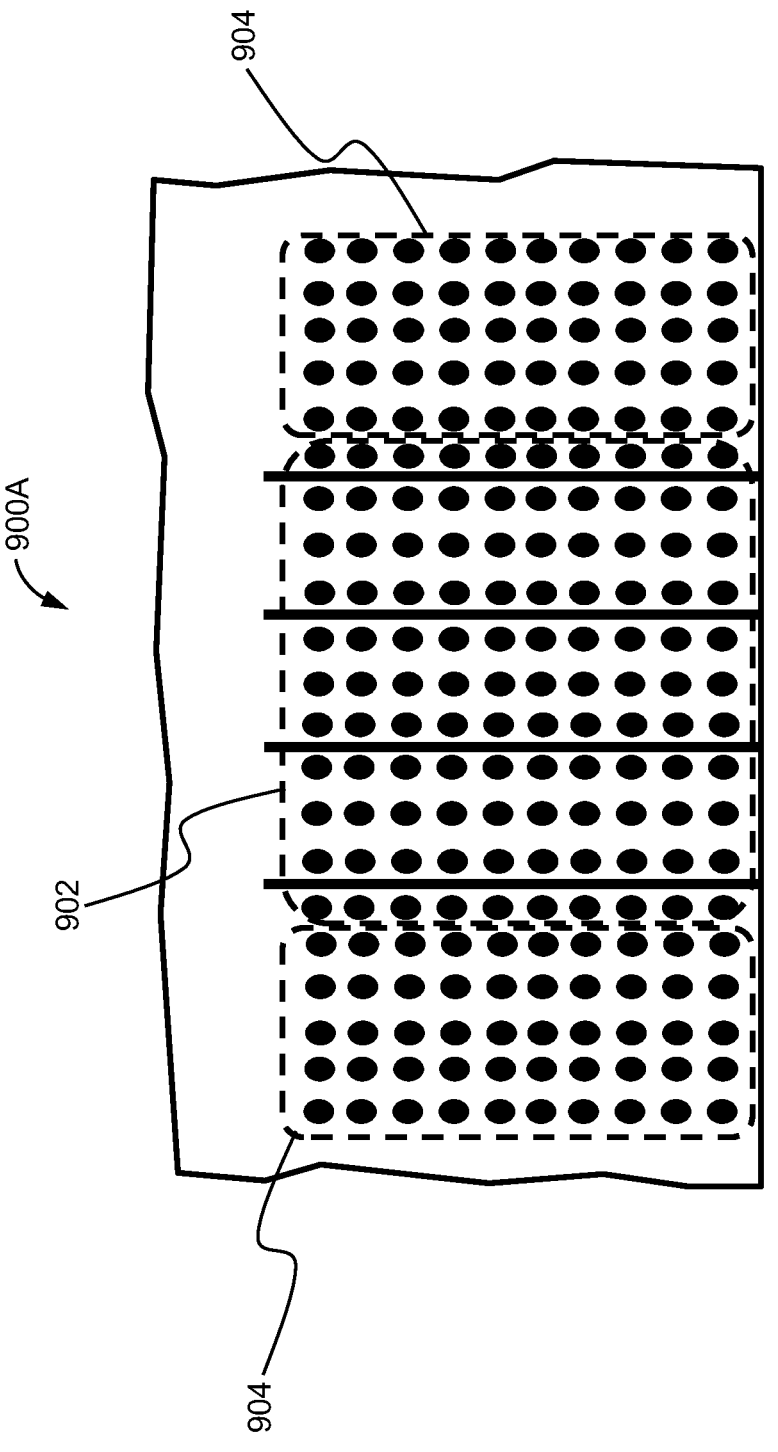
FIGS. 9A and 9B are schematic diagrams of two example PIC-LGSAs.
Figure 9B:
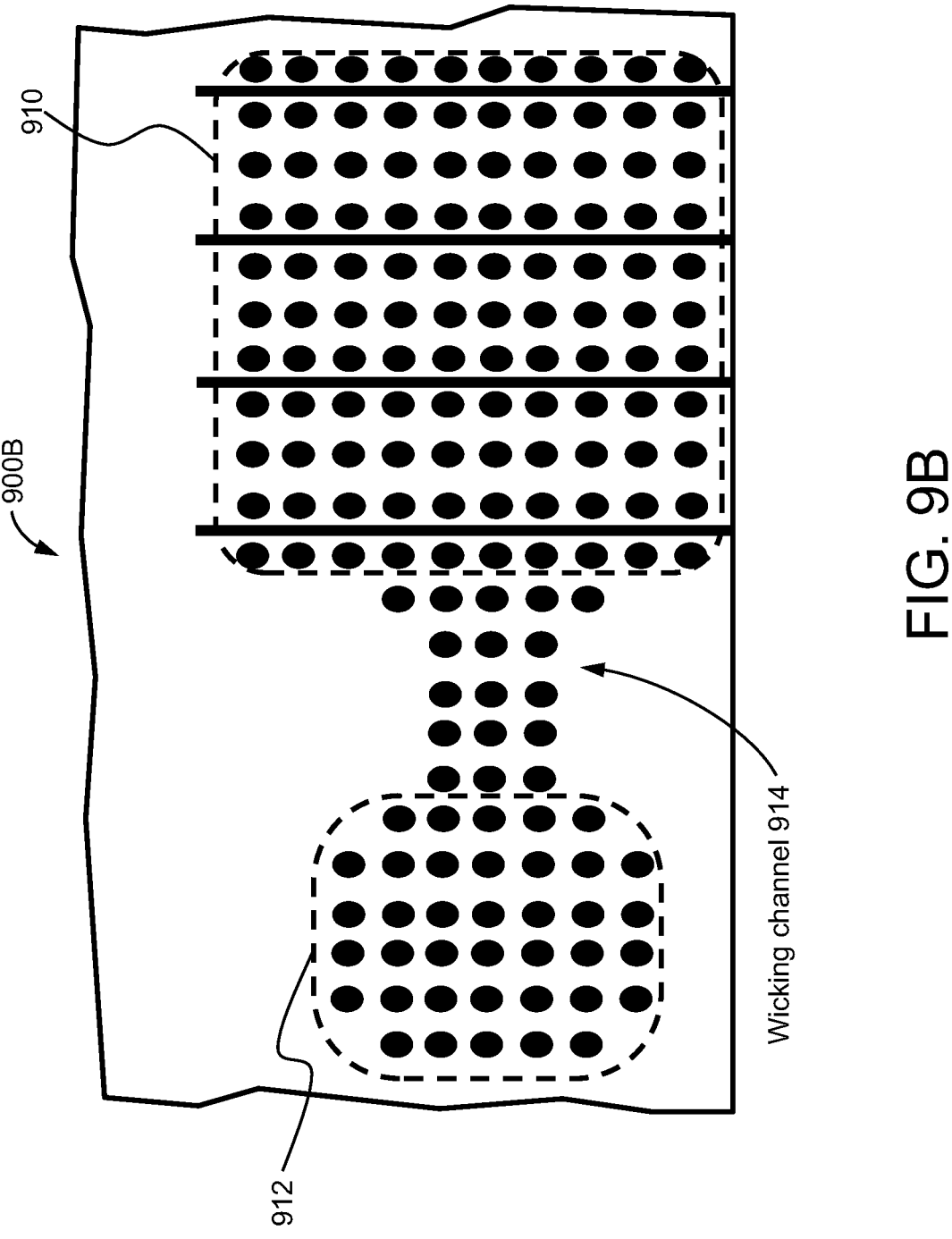

FIG. 9A shows an example PIC-LGSA 900A comprising a critical region 902 (e.g., an optical region under which there are photonic structures such as waveguides) and two overflow regions 904. FIG. 9B shows an example PIC-LGSA 900B comprising a critical region 910 (e.g., an optical region under which there are photonic structures such as waveguides), an overflow region 912, and a wicking channel 914 connecting the critical region 910 and the overflow region 912.

Referring to FIGS. 9A and 9B, dispensed volumes in the critical region (e.g., 902 in FIG. 9A and/or 910 in FIG. 9B) can be as low as 5 nanoliters and very high throughput machines may provide larger dispensed volume tolerances. To ensure a reliable coverage of the critical region, one or more overflow regions (e.g., 904 in FIG. 9A and/or 912 in FIG. 9B) can be provisioned. The one or more overflow regions allow a dispensing procedure to dispense a larger amount of adhesive to guarantee the critical region is filled to the proper level, even with a large tolerance on the dispensed adhesive volume.

Thus, in view of the foregoing description, and corresponding portions of the drawings referenced from the figures, it should be understood by a person of ordinary skill in the art, that in one aspect, in general, an article of manufacture comprises: at least a portion of a wafer comprising a substate and one or more layers fabricated on the substrate; one or more integrated photonic structures in the portion of the wafer, where at least a first integrated photonic structure of the one or more integrated photonic structures is associated with an electromagnetic wave propagation region that extends beyond a first surface of a first layer of the one or more layers; an array of structures arranged in a two-dimensional pattern on a portion of the first surface; and an adhesive material making contact with the first surface and with at least a majority of the structures in the array of structures.

Aspects can include one or more of the following features.

The two-dimensional pattern has a lower density over a first portion of the first surface in proximity to the electromagnetic wave propagation region than a second portion of the first surface that is further from the electromagnetic wave propagation region than the first portion of the first surface.

The two-dimensional pattern has rectangular shape having four corners and has a higher density in proximity to each of the corners of the rectangular shape than at least some other portions of the rectangular shape.

The two-dimensional pattern includes at least one exclusion zone in which no structures in the array of structures are located.

The electromagnetic wave propagation region only extends beyond the first surface within the exclusion zone.

No portion of the electromagnetic wave propagation region that extends beyond the first surface is within 5 microns of a border of the exclusion zone.

The two-dimensional pattern includes a first portion over a first portion of the first surface in proximity to the electromagnetic wave propagation region and having a first size (e.g., area over the first surface), a second portion over a second portion of the first surface having a second size (e.g., area over the first surface), and a third portion over a third portion of the first surface between the first portion of the first surface and the second portion of the first surface and having a third size (e.g., area over the first surface) that is less than the first size and less than the second size.

The electromagnetic wave propagation region comprises an evanescent field region of an optical mode defined by the first integrated photonic structure.

The electromagnetic wave propagation region comprises a stray light region associated with a portion of the first integrated photonic structure configured to scatter stray light.

The electromagnetic wave propagation region comprises a radio frequency (RF) propagation region configured to absorb a portion of an RF electromagnetic wave associated with an electrical signal in proximity to the first integrated photonic structure.

The adhesive material has an index of refraction that is lower than or substantially equal to an index of refraction of a material of which the first layer is composed, and the adhesive material has an optical transmittance of at least 80% when cured over at least some spectrum of optical wavelengths.

The index of refraction of the adhesive material is between 1.4 and 1.5.

The adhesive material has been cured by ultraviolet light.

The structures in the array of structures consist essentially of a polymer material.

The polymer material comprises at least one of: polyimide, benzocyclobutene (BCB), or polybenzoxazoles (PBO).

The structures in the array of structures have heights relative to the first surface of less than 20 microns.

At least some of the structure in the array of structures have different heights relative to the first surface.

The substrate comprises a semiconductor substrate.

In another aspect, in general, a method comprises: forming one or more integrated photonic structures in at least a portion of a wafer comprising a substrate and one or more layers fabricated on the substrate, where at least a first integrated photonic structure of the one or more integrated photonic structures is associated with an electromagnetic wave propagation region that extends beyond a first surface of a first layer of the one or more layers; forming an array of structures arranged in a two-dimensional pattern on a portion of the first surface; dispensing an adhesive material onto a portion of the array of structures; and curing the adhesive material after the adhesive material spreads, at least in part by capillary flow, to make contact with the first surface and with at least a majority of the structures in the array of structures.

Curing the adhesive material can comprise exposing the adhesive material to ultraviolet light.

At least one of a direction or a thickness of spread of the adhesive material is based at least in part on at least one of a distance from one or more structures of the array of structures to an edge of the portion of the wafer, a spacing between at least two structures of the array of structures, a diameter of at least one structure of the array of structures, or a height of at least one structure of the array of structures.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An article of manufacture comprising:
    at least a portion of a wafer comprising a substrate and one or more layers fabricated on the substrate;
    one or more integrated photonic structures in the at least a portion of the wafer, where at least a first integrated photonic structure of the one or more integrated photonic structures comprises an optical waveguide that guides an optical mode that extends into an evanescent field region that extends beyond a first surface of a first layer of the one or more layers;
    an array of liquid guiding structures arranged in a two-dimensional pattern on a portion of the first surface of the first layer; and
    an adhesive material making contact with the first surface of the first layer and with at least a majority of the liquid guiding structures in the array of liquid guiding structures.

2. The article of manufacture of claim 1, where the two-dimensional pattern has a lower density over a first portion of the first surface of the first layer in proximity to the evanescent field region than a second portion of the first surface of the first layer that is further from the evanescent field region than the first portion of the first surface of the first layer.

3. The article of manufacture of claim 1, where the two-dimensional pattern has rectangular shape having four corners and has a higher density in proximity to each of the corners of the rectangular shape than at least some other portions of the rectangular shape.

4. The article of manufacture of claim 1, where the two-dimensional pattern includes at least one exclusion zone in which no liquid guiding structures in the array of liquid guiding structures are located.

5. The article of manufacture of claim 4, where the evanescent field region only extends beyond the first surface of the first layer within the exclusion zone.

6. The article of manufacture of claim 5, where no portion of the evanescent field region that extends beyond the first surface of the first layer is within 5 microns of a border of the exclusion zone.

7. The article of manufacture of claim 1, where the two-dimensional pattern includes a first portion over a first portion of the first surface of the first layer in proximity to the evanescent field region and having a first size, a second portion over a second portion of the first surface of the first layer having a second size, and a third portion over a third portion of the first surface of the first layer between the first portion of the first surface of the first layer and the second portion of the first surface of the first layer and having a third size that is less than the first size and less than the second size.

8. The article of manufacture of claim 1, where the adhesive material has an index of refraction that is lower than or substantially equal to an index of refraction of a material of which the first layer is composed, and the adhesive material has an optical transmittance of at least 80% when cured over at least some spectrum of optical wavelengths.

9. The article of manufacture of claim 8, where the index of refraction of the adhesive material is between 1.4 and 1.5.

10. The article of manufacture of claim 1, where the adhesive material has been cured by ultraviolet light.

11. The article of manufacture of claim 1, where the liquid guiding structures in the array of liquid guiding structures consist essentially of a polymer material.

12. The article of manufacture of claim 11, where the polymer material comprises at least one of: polyimide, benzocyclobutene (BCB), or polybenzoxazoles (PBO).

13. The article of manufacture of claim 1, where the liquid guiding structures in the array of liquid guiding structures have heights relative to the first surface of the first layer of less than 20 microns.

14. The article of manufacture of claim 1, where at least some of the liquid guiding structures in the array of liquid guiding structures have different heights relative to the first surface of the first layer.

15. The article of manufacture of claim 1, where the substrate comprises a semiconductor substrate.

16. The article of manufacture of claim 1, where the at least a portion of the wafer is assembled in a flip chip configuration on a host substrate.

17. The article of manufacture of claim 16, where the adhesive material is distributed over a portion of the first surface of the first layer in a layer that is thin enough to avoid contacting the host substrate with the first surface of the first layer facing the host substrate in the flip chip configuration.

18. The article of manufacture of claim 1, where the evanescent field region is a first evanescent field region, a second integrated photonic structure of the one or more integrated photonic structures is associated with a second evanescent field region that extends beyond the first surface of the first layer of the one or more layers, and the portion of the first surface of the first layer on which the array of liquid guiding structures are arranged is between the first evanescent field region and the second evanescent field region.

19. An article of manufacture comprising:

at least a portion of a wafer comprising a substrate and one or more layers fabricated on the substrate;

a plurality of integrated photonic structures in the at least a portion of the wafer, where a first integrated photonic structure of the plurality of integrated photonic structures is associated with a first electromagnetic wave propagation region that extends beyond a first surface of a first layer of the one or more layers, and a second integrated photonic structure of the plurality of integrated photonic structures is associated with a second electromagnetic wave propagation region that extends beyond the first surface of the first layer;

an array of liquid guiding structures arranged in a two-dimensional pattern on a portion of the first surface of the first layer; and an adhesive material making contact with the first surface of the first layer and with at least a majority of the liquid guiding structures in the array of liquid guiding structures, where the adhesive material has a maximum height relative to the first surface of the first layer that (1) extends above respective tops of a plurality of the liquid guiding structures in the array of liquid guiding structures and (2) is less than 20 microns.

20. The article of manufacture of claim 19, where the first electromagnetic wave propagation region comprises: an evanescent field region into which an optical mode guided by an optically waveguiding portion of the first integrated photonic structure extends, or a stray light region associated with a portion of the first integrated photonic structure configured to scatter stray light.

21. The article of manufacture of claim 19, where the first electromagnetic wave propagation region comprises a radio frequency (RF) propagation region configured to absorb a portion of an RF electromagnetic wave associated with an electrical signal in proximity to the first integrated photonic structure.

* * * * *